No. 763,216. PATENTED JUNE 21, 1904.
W. SOBEY.
CLAMP FOR CULTIVATOR SHOVELS OR LIKE IMPLEMENTS.
APPLICATION FILED APR. 11, 1904.
NO MODEL.
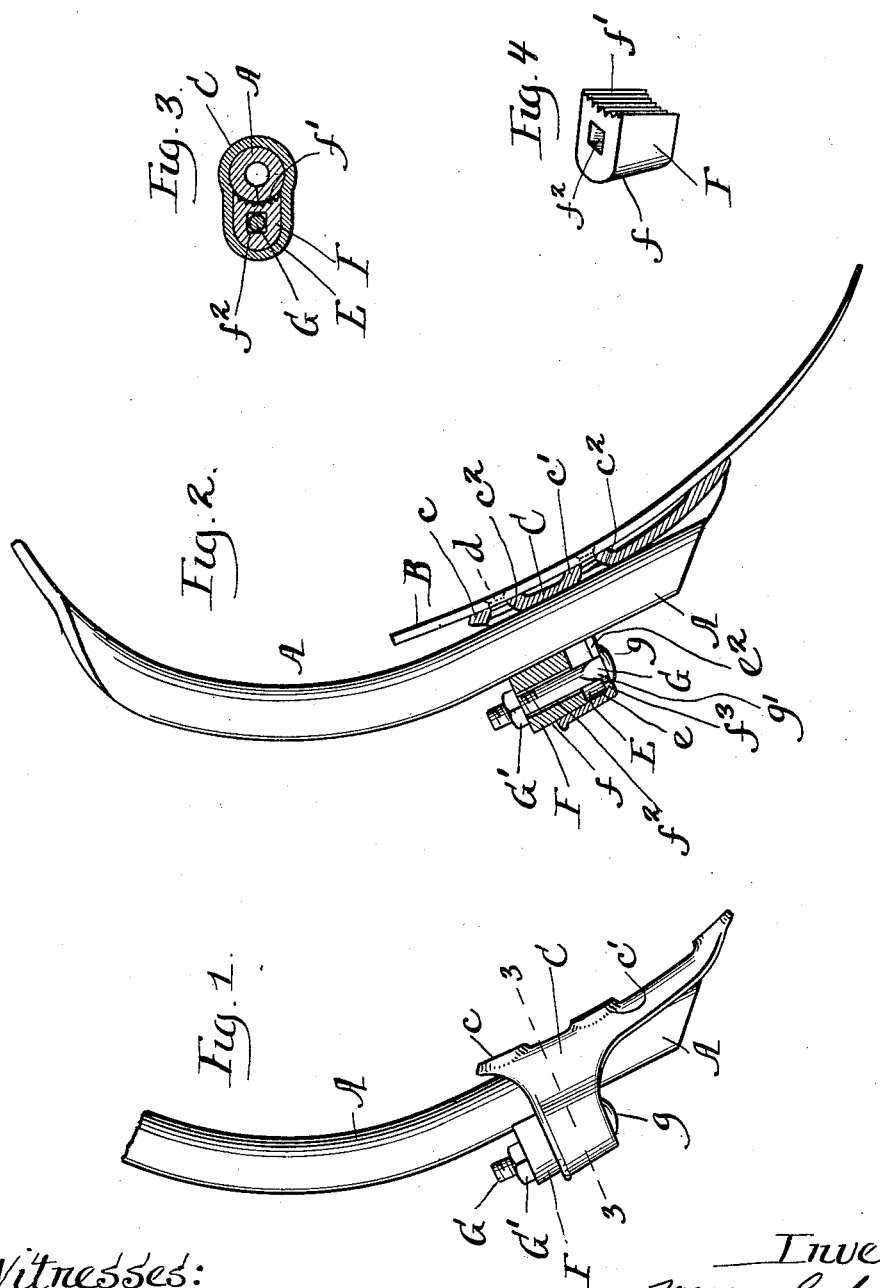

No. 763,216. Patented June 21, 1904.

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

CLAMP FOR CULTIVATOR-SHOVELS OR LIKE IMPLEMENTS.

SPECIFICATION forming part of Letters Patent No. 763,216, dated June 21, 1904.

Application filed April 11, 1904. Serial No. 202,686. (No model.)

*To all whom it may concern:*

Be it known that I, WILLIAM SOBEY, a citizen of the United States, residing at Racine, county of Racine, and State of Wisconsin, have invented certain new and useful Improvements in Clamps for Cultivator-Shovels or Like Implements, of which I do declare the following to be a full, clear, and exact description, reference being had to the accompanying drawings, forming part of this specification.

In attaching shovels of cultivators, planters, or like agricultural implements to their shanks or supports it is important to provide means whereby the shovels shall be firmly held in position, so that they will not accidentally turn or work loose, and it is also frequently desirable to provide clamping mechanism of such character that the shovels may be set at different angles with respect to their shanks or supports. Heretofore it has been customary to attach cultivator-shovels to their shanks by means of set-screws passing through the shovel-sleeve and engaging the shank, and in some cases also the shovel-sleeves have been provided with split clamps, the jaws of which were adapted to be drawn together to bind upon the shanks or supports by means of through-bolts. Neither of these prior constructions, however, have proved entirely satisfactory as a means of rigidly holding the shovels in position.

The object of the present invention is to provide an improved clamping mechanism whereby the shovels may be held in desired position; and the invention consists in the features of improvement hereinafter described, illustrated in the accompanying drawings, and particularly defined in the claims at the end of the specification.

Figure 1 is a view in side elevation showing my invention. Fig. 2 is a view in central vertical section. Fig. 3 is a view in cross-section on line 3 3 of Fig. 1. Fig. 4 is an enlarged detail view of the wedge-block employed with my invention.

A designates one form of shank or support for a cultivator-shovel, this shank being shown as formed with a tubular lower portion whereon the shovel B will be clamped. Around the lower portion of the shank or support A sets the sleeve C, that is shown as formed at its front with extensions $c$ and $c'$, having interiorly countersunk holes $c^2$, through which will pass the bolts or rivets $d$, whereby the shovel B will be securely held. At its back the sleeve C is formed with a chamber E, adapted to receive a wedge-block F, that is shown as corresponding in general outline to the interior of the chamber E. The rear wall of the chamber E is inclined downwardly and inwardly, as at $e$, and the rear wall of the wedge-block F is correspondingly inclined, as at $f$. The front face of the wedge-block F is curved and is preferably corrugated, as at $f'$, to enable the wedge-block to more securely engage the curved face of the shank or support A. The wedge-block F is formed with a hole $f^2$ extending therethrough, and through this hole passes the adjusting screw-bolt G. The lower end of the bolt G, which is formed with a broad head $g$, passes through the bottom $f^3$ of the chamber E, a slot $e^2$ being formed in the bottom of the chamber E to receive the squared portion $g'$ of the bolt. The upper end of the bolt G is threaded and is furnished with a nut G', adapted to bear upon the top of the wedge-block F.

From the foregoing description it will be seen that when the shovel-sleeve has been set in desired position upon the shank A and the wedge-block F has been placed within the chamber E the tightening of the nut G' upon the bolt G will cause the wedge-block F to move downwardly along the inclined back wall $e$ of the chamber E, thereby causing the front curved face $f'$ of the wedge-block to tightly bind against the rear face of the shank A and to draw the front part of the sleeve C against the front curved face of the shank. It will readily be seen that by loosening the nut G' the shovel can be turned to any desired angle, and when the wedge-block is clamped to position, as shown in the drawings, the shovel will be securely held in position against danger of working loose or of becoming accidentally displaced. Inasmuch as the lower end of the bolt G is held by the walls of the slot $c^2$ of the chamber E, the bolt will be rigidly held while the nut G' is turned. By my invention a most simple and effective means is provided for securly holding the shovels of cultivators, planters, or like implements in position.

Manifestly the precise details of construction above set out may be varied without departure from the spirit of the invention.

Having thus described my invention, what I claim as new, and desire to secure by Letters Patent, is—

1. Means for clamping a cultivator-shovel or like implement comprising a sleeve having at its front a part to which the shovel is attached and having a vertical socket to receive the shank or support, a chamber extending therefrom, a wedge-block in said chamber and an adjusting-screw for said block.

2. Means for clamping a cultivator-shovel or like implement comprising a sleeve having at its front a part to which the shovel is attached and having a socket to receive the shank or support, a chamber extending therefrom, a perforated wedge-block in said chamber and an adjusting-screw passing through said wedge-block whereby the wedge-block may be caused to tightly bind upon the shank or support of the shovel.

3. Means for clamping a cultivator-shovel or like implement comprising a sleeve having at its front a part to which the shovel is attached and having a socket to receive the shank or support, a chamber extending therefrom and provided at its back with an inclined wall, a wedge-block having a correspondingly-inclined rear face setting within said chamber and an adjusting-screw for said wedge-block.

4. The combination with the shank or support for the shovel, of a sleeve having a socket fitting around said shank or support, said sleeve being provided at one side of said shank with a part to which the shovel is secured and being provided at the opposite side with a chamber extending therefrom and having an open bottom, a wedge-block within said chamber and an adjusting-screw passing through said wedge-block and through the open bottom of said chamber and whereby said wedge-block may be caused to tightly bind upon said shank or support.

5. Means for clamping a cultivator-shovel or like implement comprising a sleeve having at its front a part to which the shovel is attached and having a socket to receive the shank or support, a chamber extending rearwardly therefrom and having an inclined back wall provided with a slotted bottom, a correspondingly-inclined perforated wedge-block within said chamber, said wedge-block having a curved face to engage the shank or support and an adjusting-screw having a headed end and having a squared portion extending within the slot of said chamber, said adjusting-screw passing through said perforated wedge-block.

WILLIAM SOBEY.

Witnesses:
HARRY N. DONALDSON,
LAWRENCE SCHIBSBY.